US006712600B2

(12) United States Patent
Sattler et al.

(10) Patent No.: US 6,712,600 B2
(45) Date of Patent: Mar. 30, 2004

(54) ACTUATING CYLINDER FOR A VALVE GATED INJECTION MOULDING DEVICE

(75) Inventors: Peter Sattler, Zwingenberg (DE); Udo Liebram, Pfungstadt (DE)

(73) Assignee: Synventive Molding Solutions B.V., 'S-Gravendeel (NL)

( * ) Notice: Subject to any disclaimer, the term of this patent is extended or adjusted under 35 U.S.C. 154(b) by 0 days.

(21) Appl. No.: 10/041,632

(22) Filed: Jan. 10, 2002

(65) Prior Publication Data

US 2002/0094355 A1 Jul. 18, 2002

(30) Foreign Application Priority Data

Jan. 10, 2001 (EP) .............................. 01200059

(51) Int. Cl.[7] .............................................. B29C 45/23
(52) U.S. Cl. ....................................... 425/564; 425/566
(58) Field of Search ................................ 475/562, 563, 475/564, 565, 566

(56) References Cited

U.S. PATENT DOCUMENTS 5,080,575 A * 1/1992 Berg et al. .................. 425/564
5,894,025 A * 4/1999 Lee et al. .................... 425/562

FOREIGN PATENT DOCUMENTS

| DE | 43 00 334 A1 | 7/1993 |
| EP | 0 920 970 A1 | 6/1999 |
| WO | 98/56560 | 12/1998 |
| WO | 00/71325 A1 | 11/2000 |

* cited by examiner

*Primary Examiner*—Tim Heitbrink
(74) *Attorney, Agent, or Firm*—Young & Thompson

(57) ABSTRACT

An injection molding device (1) having a valve pin (11) and an actuating cyclinder (15) connected to the valve pin (11). The valve pin head (37) is releasably attached to the piston (33) of the cylinder such that the cylinder can be removed while leaving the valve pin (11) from the nozzle such that a low headspace can be achieved above the nozzle.

9 Claims, 4 Drawing Sheets

ACTUATING CYLINDER FOR A VALVE GATED INJECTION MOULDING DEVICE

BACKGROUND OF THE INVENTION

The invention relates to an injection molding device comprising a mold body having a cavity, an elongated nozzle seated in the cavity, a valve pin coaxially in the nozzle and actuating means connected to the valve pin for axially displacing the valve pin in the nozzle, the actuating means comprising a cylinder housing having a first and a second pressure medium inlet, and a piston reciprocatable in the cylinder housing, the cylinder piston being coupled to the valve pin.

DETAILED DESCRIPTION OF THE RELATED ART

A valve gated injection molding device of the above-mentioned type is known from EP-A-0 836 925 in the name of the applicant. By axial displacement of the valve pin, the gate of the nozzle is opened and closed to control the flow of molten thermoplastic material into a mold cavity. The valve pin head projects from the upper part of the nozzle and is seated in a sliding bush which is axially displaced by means of a lever arm. The lever arm is connected to a hydraulic cylinder that is placed at a radially offset location from the valve pin. The known valve pin actuator has as a disadvantage that it requires a relatively large space outside the injection molding body, and that a relatively complex lever system is used for coupling the piston to the valve pin head. Especially in injection molding devices wherein the nozzles are to be located in close proximity to a central feed of thermoplastic material in the manifold, it is required for the actuating cylinders to be relatively compact, while at the same time providing a sufficient stroke for operation of the valve pin. Furthermore, access to the valve pin head is relatively cumbersome and may require taking a part of the mould body apart.

SUMMARY OF THE INVENTION

It is an object of the present invention to provide a valve gated injection molding device, having a valve pin actuator of relatively compact dimensions which is of a simple construction. It is a further object to provide a valve pin actuator, which can be easily detached from the injection molding device for maintenance, or replacement, Hereto the injection molding device according to the invention is characterised in that the cylinder is placed above the valve pin, coaxial therewith, the cylinder housing being detachably coupled to a base member on the mold body, and defining a chamber with an upper part having a first diameter, the piston having a piston head which is in contacting relationship with the walls of the upper chamber part, the first and second pressure medium inlets connecting to the upper chamber part above and below the piston head, respectively, and a lower chamber part comprising height adjustment means that are axially displaceable in the cylinder housing, the height adjustment means comprising a bore having a second diameter, smaller than the diameter of the upper chamber part, the piston comprising a stem being slidably seated in the bore of the height adjustment means, the valve pin being guided through a bore in the base member and through the bore of the height adjustment means and being with a valve pin head releasably attached to the piston.

By placing the actuating cylinder directly above the valve pin head, no complex transmission from the piston to the valve pin is required. The linear motion of the piston is transmitted directly to the valve pin. The cylinder according to the invention can easily be installed, and a fine-tuning of the stroke of the piston is effected via the height adjustment means. Removal of the cylinder can be effected by decoupling the cylinder housing followed by detaching the valve pin head from the piston, and removal of the piston and the height adjustment means while the valve pin remains sealed in the flow channel of the nozzle. Not removing the valve pin from the nozzle has as an advantage that only a low headspace is required to remove the actuating cylinder and that the risk of damage to the valve pin is minimised. Also, the rotational position of the valve pin is maintained upon removal of the cylinder. Furthermore, removal of the cylinder according to the invention is facilitated by the fact that no adhesive forces of the solidified thermoplastic material sticking to the needle need to be overcome, which normally occur when removing the valve pin from the nozzle.

An embodiment of the injection molding device according to the invention is characterised in that the piston stem comprises an axial slot, extending to the perimeter of the stem, the slit having a supporting shoulder engaging with a complementary shoulder on the valve pin head, the valve pin head being radially removable from the stem.

The valve pin head is easily removed from the piston by radial displacement of the piston, after removal of the housing, such that the valve pin head is released and the piston and the height adjustment means can be removed. The slot may have a generally T-shaped cross-section. In an embodiment, the valve pin head comprises a flat section which is received in the narrow part of the T-shaped slot in a fixed angular position. In this way the valve pin head is fixed in the proper angular orientation by the piston, which is required when the nozzle tip has a non-rotationally symmetric configuration and a contoured valve pin tip is used.

In a preferred embodiment, the cylinder housing is placed on a cooled base plate. In this way, the interior of the cylinder is thermally insulated from the heated mold body, the temperature of which may for instance be about 200° C.–350° C. By the cooled base plate, the internal seals of the cylinder are not exposed to high temperatures, such that the service life is increased.

BRIEF DESCRIPTION OF THE DRAWINGS

An embodiment of an injection molding device according to the present invention will, by way of example, be described in detail with reference to the accompanying drawing. In the drawing.

DESCRIPTION OF THE PREFERRED EMBODIMENTS

Figure 1:
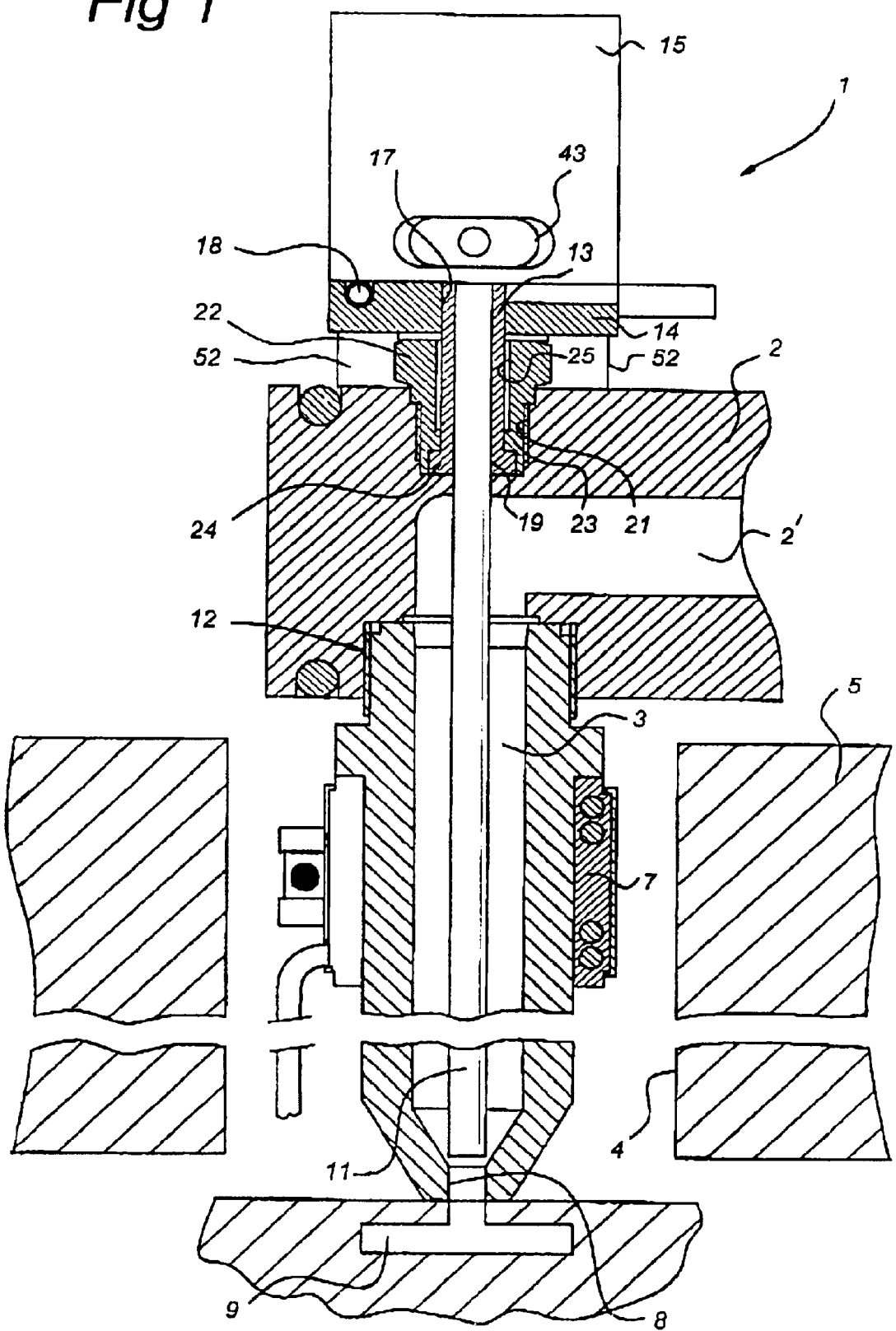
FIG. 1 shows a cross-sectional view of an in injection molding device according to the invention.

FIG. 1 shows an injection moulding device 1, comprising a manifold 2 having a transverse duct 2' for supplying molten thermoplastic material to a vertical nozzle, or hot runner 3. In the manifold 2, the thermoplastic material is supplied at a temperature which may amount to over 350° C.

at a pressure of for instance 200 bar. The nozzle 3 is connected to the manifold 2 and is seated in a well 4 of the mould body 5. The nozzle 3 is separated from the mould body 5, which may have a temperature of for instance 40° C. by an air gap, surrounding the nozzle 3. The nozzle 3 is surrounded by a heating element 7, to keep the temperature of the thermoplastic material above the melting point. The molten thermoplastic material exits the nozzle 3 via a gate 8 to enter into a mould cavity 9. The gate 8 is opened and closed by a valve pin 11 which can slide up and down in the nozzle 3. The valve pin 11 exits at the upper end 12 of the nozzle 3, a bore in the manifold 2, and is guided by a bush 13. The valve pin passes through a cooling plate 14 and is attached to a hydraulic cylinder 15 that is located in line with the valve pin 11. The bush 13 is clampingly pressed into a central bore 17 of the cooling plate 14, or is connected via a sliding fitment to be in good heat conducting contact with the cooling plate 14. The cooling plate 14 comprises a generally circular cooling channel 18, in which a cooling medium, such as water, is circulated. The relatively cool bush 13 is seated in a cavity 21 in the manifold 2 and is only supported with a relatively small surface area of the end part 19 onto the hot manifold 2, such that heat transfer from the manifold to the bush 13, and hence to the cylinder 15, is minimised.

The bush 13 is connected to the manifold 2 by a clamping ring 22 which is screwed into the cavity 21.

The clamping ring 22 comprises a shoulder 23 that engages a shoulder 24 of the bush 13. The inner sidewall 25 of the clamping ring 22 is spaced from the bush 13, such that an insulative air gap is formed between the bush and the clamping ring. By using a relatively long bush 13, which is connected to the cooling plate 14, the viscosity of the molten thermoplastic material at the position of the bush 13 is increased. Hereby leakage of molten thermoplastic material from the manifold 2 can be prevented, even at a relatively large play of the bush 13 around the valve pin 11, such as 20 micrometer or more. Furthermore, the (partly) solidified thermoplastic material in the gap between the bush 13 and the valve pin 11 has a lubricating effect, so that metal-to-metal wear of the valve pin 11 against the metal bush material is prevented.

Figure 2:
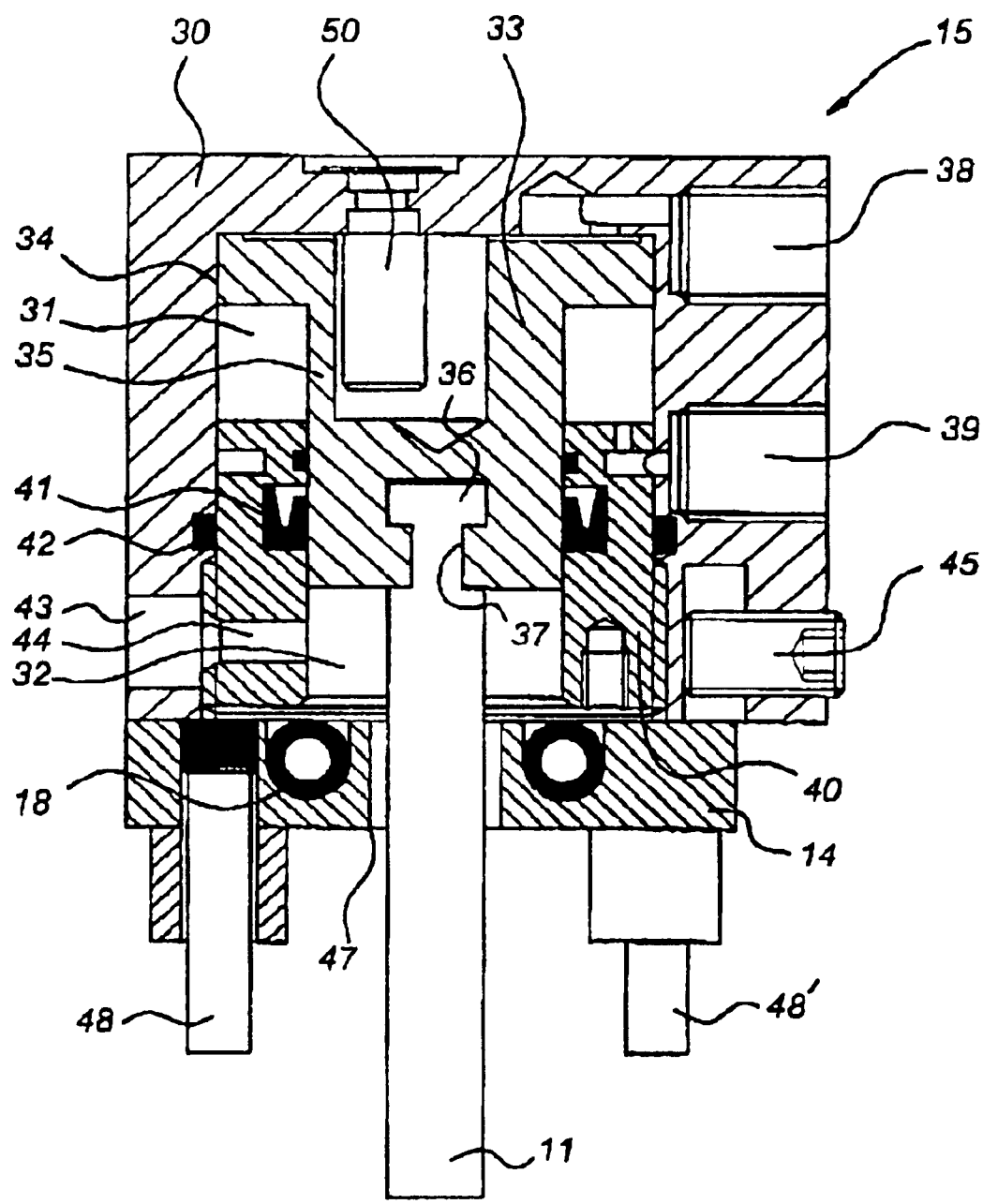
FIG. 2 shows a cross-sectional view of the actuating cylinder of the injection molding device of FIG. 1.

FIG. 2 shows a cross-sectional view of the cylinder 15, including a cylinder housing 30 in which a piston 33 can be displaced between an upper chamber part 31 and a lower chamber part 32. The piston 33 comprises a piston head 34 and a stem 35. The stem 35 comprises a T-shaped recess 36 in which the valve pin head 37 is seated in a rotationally fixed orientation.

The cylinder housing 30 comprises two bores 38,39, one on either side of the piston head 34, connected to fluid ducts. The stem 35 of the piston 33 is seated in a bore of a height adjustment ring 40, which is screwed into the lower part 32 of the cylinder housing 30. By axially displacing the ring 40 within the housing 30, the stroke of the piston 33 can be varied within a range of several mm. Flexible seals 41, 42, for instance made of PTFE, prevent leakage of the hydraulic oil from the chamber 31. The height adjustment ring 40 can be accessed via an elongated slot 43 in the cylinder housing 30, through which a tool can be inserted into several recesses 44 in the circumferential wall of the height adjustment ring 40, in order to rotate the ring. The ring 40 is locked at its proper height via a locking bolt 45.

The valve pin 11 enters through a central bore 47 in the cooling plate 14 into the cylinder housing 30, which is releasably connected to the cooling plate 14, which in turn is connected to the manifolds via two locating pins 48 and two bolts 48'.

The piston 33 can slide axially within the housing 30 along a locator pin 50, which maintains the piston in its desired angular orientation. The walls of the piston head 34 form a non-liquid tight connection with the inner wall of the cylinder housing, so that some hydraulic oil may leak from the high pressure side of the piston head 34 to the low pressure side, when the piston is not in either its upper or its lower end position. Hereby degradation of the hydraulic oil is prevented, and an automatic venting for removal of air from the cylinder 15 is achieved. Furthermore, the small oil flow from the high pressure side to the low pressure side of the piston head 34, which occurs while the piston is travelling from one end position to the other end position, can be use to obtain an indication of the piston position. By placing the cylinder 15 onto the manifold 2, via the cooling plate 14, the seals 41,42 are protected from the high temperatures of the manifold. The construction of the cylinder 15 is very compact, and can easily be accommodated in the limited space available in injection molding systems, in which a small distance between several nozzles is desired.

Figure 3:
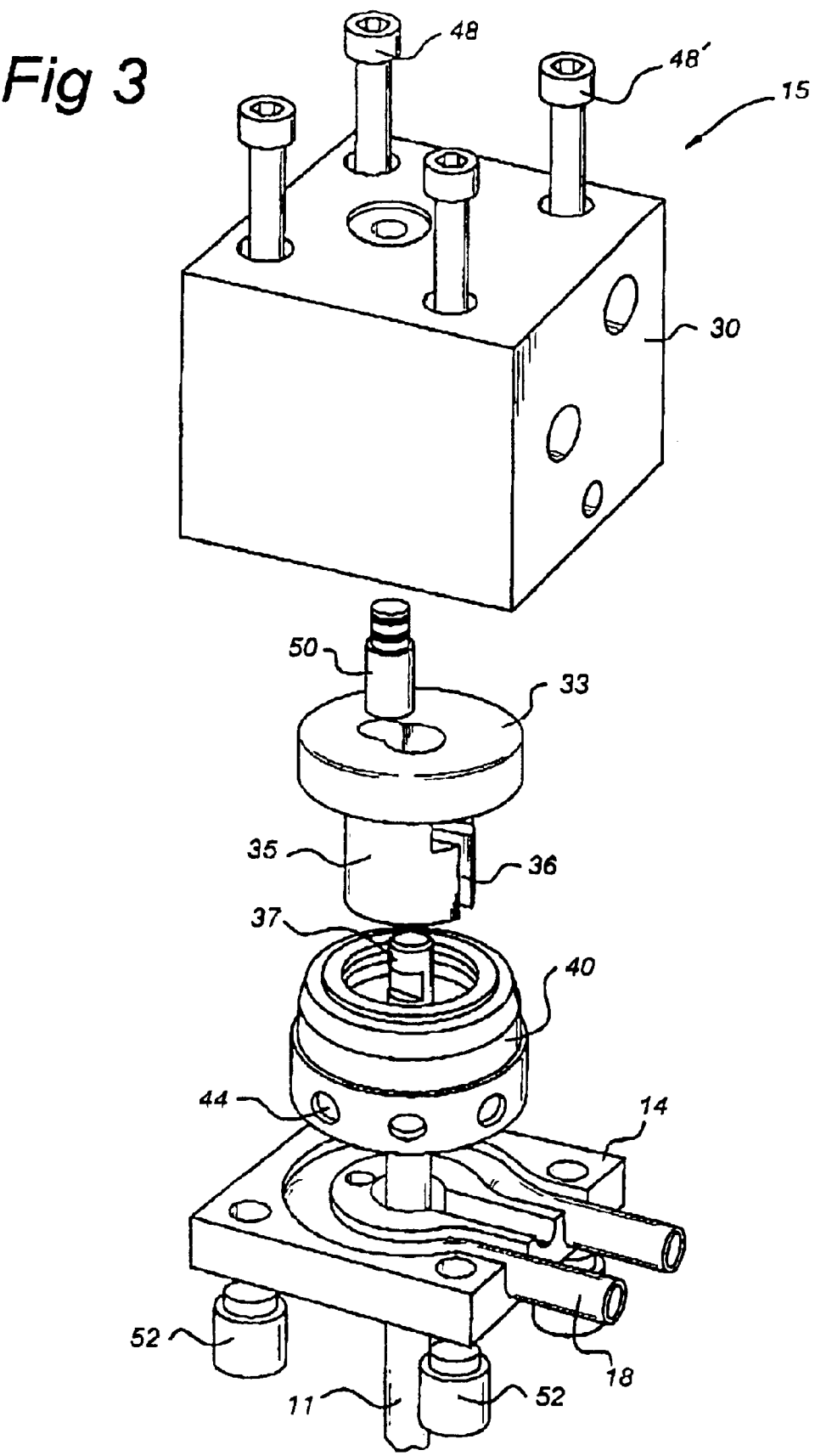
FIG. 3 shows an exploded view of the cylinder of FIG. 2.

As can be seen from FIG. 3, the cylinder housing 30 can be easily detached from the cooling plate 14 by two locating pins 48 and tow bolts 48', which project through refractive spacer members 52 via which the cooling plate 14 is supported on the Manifold. After detaching the housing 30, the piston 33 can be lifted from the height adjustment ring 40. Next, the piston is moved parallel to the cooling plate 14, such that the valve pin head exits the T-shaped axial slot 36 in the piston stem 35, in the radial direction. Instead of a T-shaped slot in the piston stem 35, the valve pin head may be seated in a groove in the stem 35 and be connected by pins or bolts. In this way, the cylinder 15 can be disconnected from the valve pin 11 without removal of the valve pin 11 from the nozzle 3. Because the valve pin can remain seated within the nozzle, no cleaning of the valve pin/slide bush is required which would be the case if the valve pin were to be removed from the nozzle. Furthermore, removal of the valve pin from the nozzle would require heating of the nozzle prior to removal, which is not necessary for the valve pin, according to the present invention.

Figure 4:
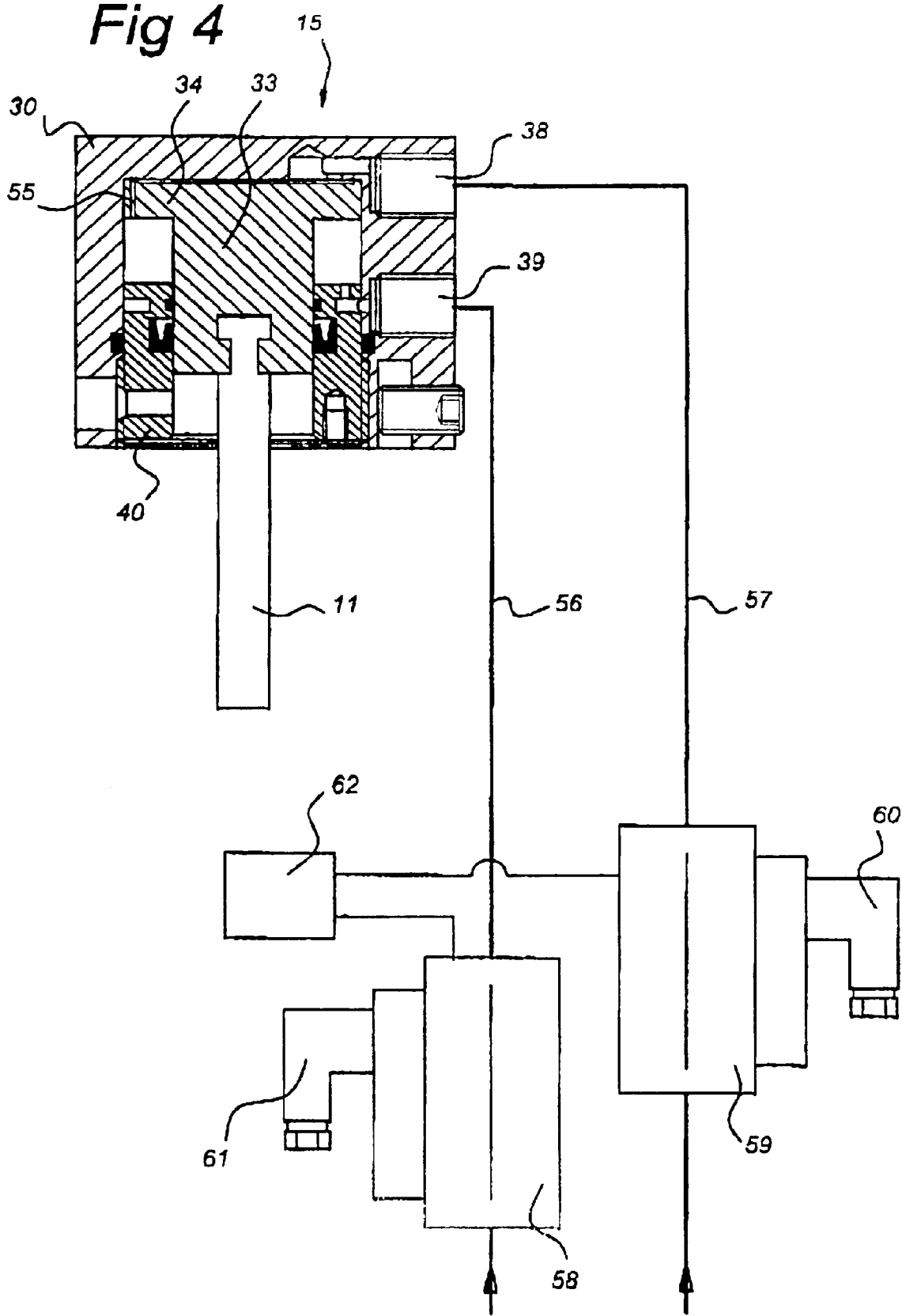
FIG. 4 shows an end position indicator for the cylinder, comprising a flow meter in the hydraulic ducts.

As can be seen in FIG. 4, the piston head 34 of the piston 33 comprises a bore 55, via which hydraulic oil can pass when the piston head is not engaged with the cylinder housing 30 in its upper end position or with the height adjustment ring 40 in its lower end position. In the end positions of the piston, the bore 55 is blocked such that no oil can pass through. In the hydraulic ducts 56,57, a flow meter 58,59 is comprised, generating a displacement signal, indicating when the piston is not in one of its end positions. The displacement signals can be transmitted to a processing and/or display device 62 for indicating the end position of the valve pin 11. The processing device 62 cam be used for automatic control of several valve pins in the injection molding apparatus, for instance for sequentially filling a larger mold cavity from several nozzles. The flow meters 58, 59 as well as the processing/display device 62 can be placed outside the high temperature area of the injection molding device. When the height adjustment ring 40 is moved to vary the stroke of the piston 33, the stopping surface of the ring 40 closing off the bore 55 is moved, such that Me end position of the valve pin is indicated properly at all times. Existing injection molding apparatus having a hydraulically or pneumatically driven valve pin can be provided with a position indicator according to the present invention in a simple manner by providing a bore 55 in the piston 33, and incorporating flow meters 58,59 in the ducts 56,57.

What is claimed is:

1. Injection moulding device (1) comprising a mould body (2,5) having a cavity (4), an elongated nozzle (3) seated in the cavity, a valve pin (11) coaxially in the nozzle and actuating means (15) connected to the valve pin for axially displacing the valve pin in the nozzle, the actuating means comprising a cylinder housing (30) having a first and a second pressure medium inlet (38,39), and a piston (33) reciprocatable in the cylinder housing, the piston (33) being coupled to the valve pin (11), characterised in that the cylinder housing is placed above the valve pin (11), coaxial therewith, the cylinder housing (30) being detachably coupled to a base member (14) on the mould body (2,5) and said cylinder housing defining a chamber with an upper part (31) having a first diameter, the piston (33) having a piston head (34) which is in contacting relationship with the walls of the upper chamber part (31), the first and second pressure medium inlets (38,39) connecting to the upper chamber part (31) above and below the piston head, respectively, and a lower chamber part (32) comprising a height adjustment means (40) that is axially displaceable in the cylinder housing (30), the height adjustment means (40) having a bore with a diameter, smaller than the diameter of the upper chamber part (31), the piston comprising a stem (35) being slidably seated in the bore of the height adjustment means (40), the valve pin (11) being guided through a bore (47) in the base member (14) and through the bore of the height adjustment means (40) and having a valve pin head (37) releasably attached to the piston (33).

2. Injection moulding device (1) according to claim 1, wherein the piston stem (35) comprises an axial slot (36), extending to the perimeter of the stem, the slot (36) having a supporting shoulder engaging with a complementary shoulder on the valve pin head (37), the valve pin head being radially removable from the stem (35).

3. Injection moulding device (1) according to claim 2, wherein the slot (36) has a generally T-shaped cross-section.

4. Injection moulding device (1) according to claim 2, wherein the valve pin head (37) comprises a flat section which is received in the slot (36) in a fixed angular position.

5. Injection moulding device (1) according to claim 1, wherein the height adjustment means (40) comprises a number of engagement elements (44) around its perimeter, the cylinder housing (30) comprising an opening (43) connecting with the engagement elements (44).

6. Injection moulding device (1) according to claim 1, wherein the base member (14) comprises a cooling plate, having a cooling channel (18) located below the cylinder (15).

7. Injection moulding device (1) comprising a mould body (2,5) having a cavity, an elongated nozzle (3) seated in the cavity, a valve pin (11) extending coaxially in the nozzle and actuating means (15) connected to the valve pin for axially displacing the valve pin in the nozzle, the actuating means comprising a cylinder housing (30) having a first and a second pressure medium inlet (38,39) and a piston (33) reciprocatable in the cylinder housing (30), the piston (33) being coupled to the valve pin (11), characterised in that the cylinder housing is placed above the valve pin (11), coaxial therewith, the cylinder housing (33) being detachably coupled to a base member (14) on the mould body (2,5), and said cylinder housing defining a chamber with an upper part (31) having a first diameter, the piston having a piston head (34) which is in contacting relationship with the walls of the upper chamber part (31), the first and second pressure medium inlets (38,39) connecting to the upper chamber part (31) above and below the piston head (34), respectively, and a lower chamber part (32) comprising a height adjustment means that is axially displaceable in the cylinder housing (30), the height adjustment means (40) having a bore with a diameter smaller than the diameter of the upper chamber part (31), the piston comprising a stem (35) slidably seated in the bore of the height adjustment means (40) along flexible seals (42) at the perimeter of the bore, the valve pin (11) being guided through a bore (17) in the base member (14) and through the bore of the height adjustment means (40), the base member comprising a cooling channel (18) located below the cylinder (15).

8. Cylinder assembly (14,15) comprising a cylinder housing (30) having a first and second pressure medium inlet (38,39), and a piston (33) reciprocatable in the cylinder housing (30), the piston (33) being coupled to the valve pin (11), characterised in that the cylinder housing (30) is detachably coupled to a base member (14) and defining a chamber with an upper part (31) having a first diameter, the piston (33) having a piston head (34) which is in contacting relationship with the walls of the upper chamber part (31), the first and second pressure medium inlets (38,39) connecting to the upper chamber part above and below the piston head (34), respectively, and a lower chamber part (32) comprising a height adjustment means (40) that is axially displaceable in the cylinder housing, the height adjustment means having a bore with a second diameter smaller than the diameter of the upper chamber part (31), the piston comprising a stem (35) being slidably seated in the bore of the height adjustment means (40) along flexible seals (42) at the perimeter of the bore, the valve pin (11) being guided through a bore (17) in the base member and through the bore of the height adjustment means (40), the base member comprising a cooling channel (18) located below the cylinder (15).

9. Injection moulding device (1) according to claim 3, wherein the valve pin head (37) comprises a flat section which is received in the slot (36) in a fixed angular position.

* * * * *